United States Patent [19]

Li et al.

[11] Patent Number: 5,660,672
[45] Date of Patent: Aug. 26, 1997

[54] IN-SITU MONITORING OF CONDUCTIVE FILMS ON SEMICONDUCTOR WAFERS

[75] Inventors: Leping Li, Poughkeepsie; Steven George Barbee, Dover Plains; Arnold Halperin, Cortlandt Manor; Tony Frederick Heinz, Chappaqua, all of N.Y.

[73] Assignee: International Business Machines Corporation, Armonk, N.Y.

[21] Appl. No.: 419,208

[22] Filed: Apr. 10, 1995

[51] Int. Cl.⁶ .......................... H01L 21/302; G01B 7/06
[52] U.S. Cl. .......................... 156/345; 324/71.5; 324/230; 324/234
[58] Field of Search .................. 324/71.5, 229, 324/230, 231, 234, 236–239, 654, 655, 765, 207.16, 207.26; 156/626.1, 627.1, 345; 216/84, 86; 437/7, 8

[56] References Cited

U.S. PATENT DOCUMENTS

| | | | |
|---|---|---|---|
| 2,572,908 | 10/1951 | Brenholdt | 324/229 |
| 2,916,694 | 12/1959 | Hanysz et al. | 324/230 |
| 3,064,184 | 11/1962 | Watkiss | 324/230 |
| 3,077,858 | 2/1963 | Ulug | 324/230 |
| 3,381,217 | 4/1968 | Williamson et al. | 324/236 |
| 3,450,985 | 6/1969 | Lorenzi et al. | 324/230 |
| 3,473,110 | 10/1969 | Hardin et al. | 324/236 |
| 3,626,344 | 12/1971 | Shaternikov et al. | 336/73 |
| 3,878,457 | 4/1975 | Rodgers | 324/229 |
| 3,996,510 | 12/1976 | Guichard | 324/236 X |
| 4,197,676 | 4/1980 | Sauerland | 51/165 R |
| 4,328,462 | 5/1982 | Jensen | 324/229 |
| 4,556,845 | 12/1985 | Strope et al. | 324/230 |
| 4,715,007 | 12/1987 | Fujita et al. | 364/563 |
| 4,793,895 | 12/1988 | Kaanta et al. | 156/627 |
| 4,992,135 | 2/1991 | Doan | 156/636 |
| 5,017,869 | 5/1991 | Oliver | 324/230 |
| 5,081,421 | 1/1992 | Miller et al. | 324/671 |
| 5,132,617 | 7/1992 | Leach et al. | 324/207.16 |
| 5,213,655 | 5/1993 | Leach et al. | 156/627 |
| 5,222,329 | 6/1993 | Yu | 51/165.77 |
| 5,243,524 | 9/1993 | Leach et al. | 156/345 |
| 5,308,438 | 5/1994 | Cote et al. | 156/636 |
| 5,337,015 | 8/1994 | Lustig et al. | 324/671 |
| 5,416,411 | 5/1995 | Elsmore | 324/230 |

FOREIGN PATENT DOCUMENTS 4-215013 8/1992 Japan.

OTHER PUBLICATIONS

"Detecting Undesired Breaks in Metal Ladders" F.J. Soychak, IBM Technical Disclosure Bulletin, vol. 9, No. 4, Sep. 1966, pp. 358–359.

*Primary Examiner*—Gerard R. Strecker
*Attorney, Agent, or Firm*—Alison D. Mortinger

[57] ABSTRACT

The change in thickness of a film on an underlying body such as a semiconductor substrate is monitored in situ by inducing a current in the film, and as the thickness of the film changes (either increase or decrease), the changes in the current are detected. With a conductive film, eddy currents are induced in the film by a generating an alternating electromagnetic field with a sensor which includes a capacitor and an inductor.

64 Claims, 9 Drawing Sheets

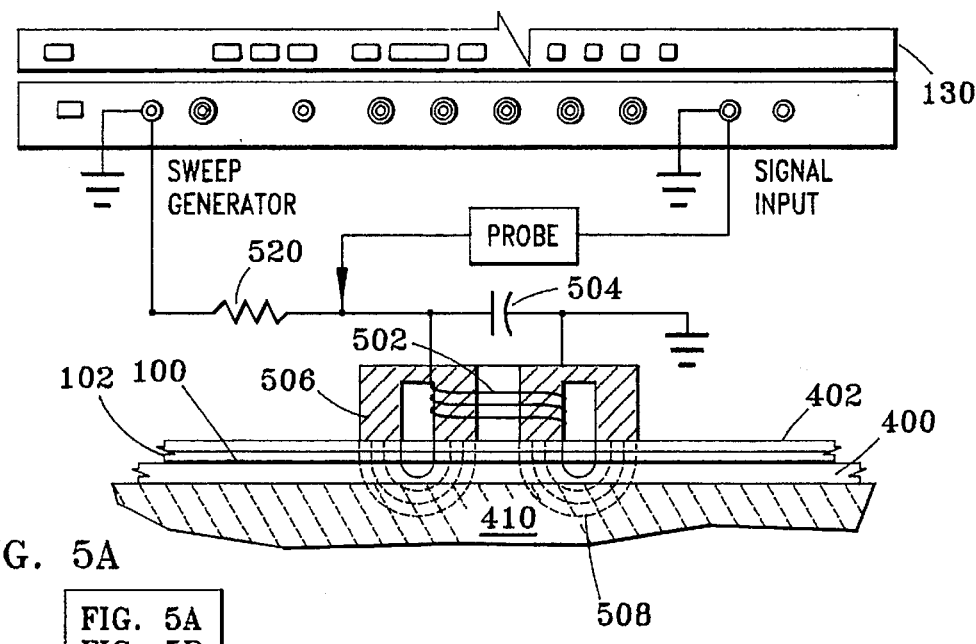
FIG. 5A
| FIG. 5A |
| FIG. 5B |
| FIG. 5C |
| FIG. 5D |
FIG. 5B
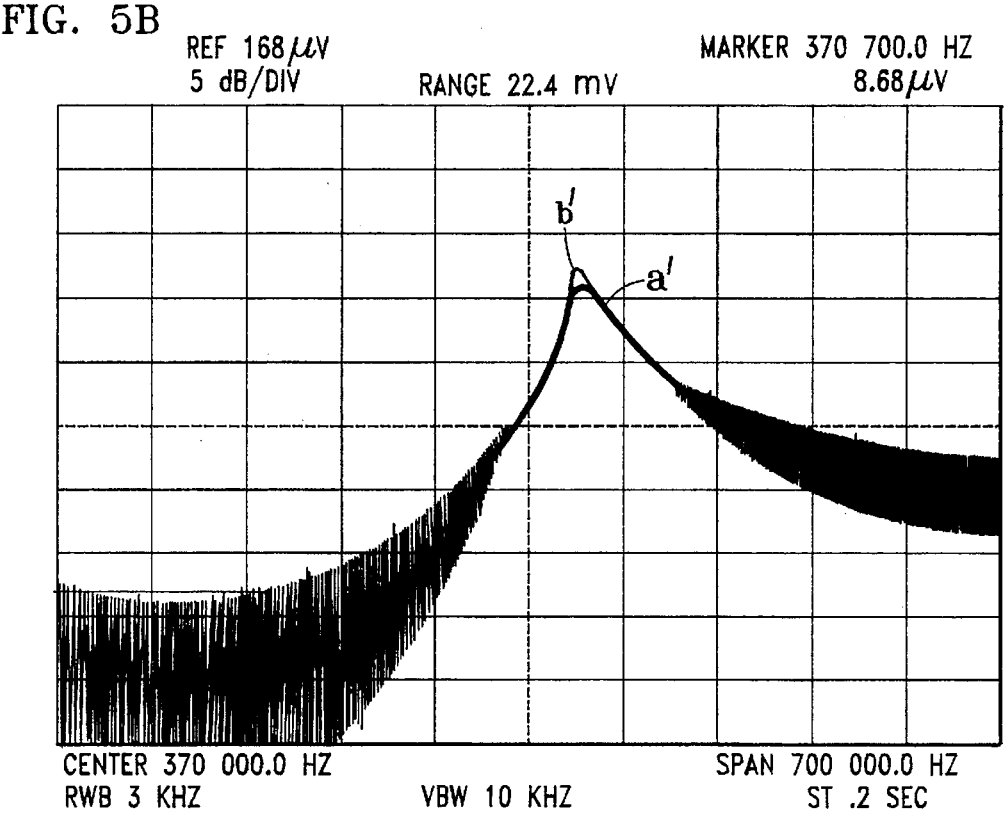
a' — WITH CU FILM    b' — WITHOUT CU FILM a' – WITH CU FILM        b' – WITHOUT CU FILM

| FIG. 6A |
| FIG. 6B |
| FIG. 6C |
| FIG. 6D |

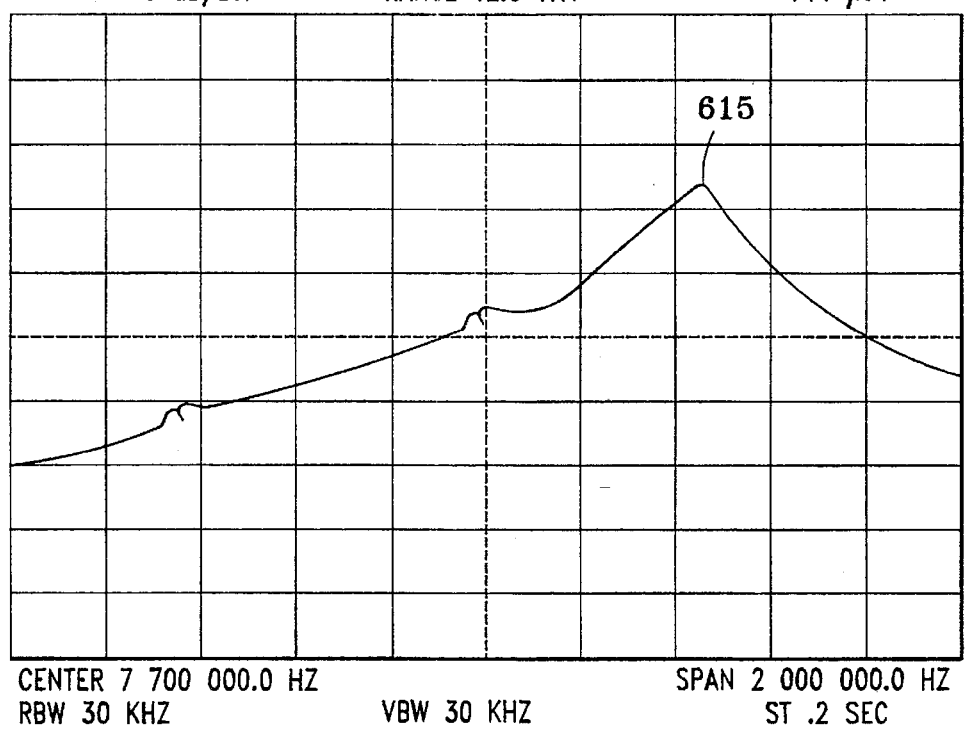
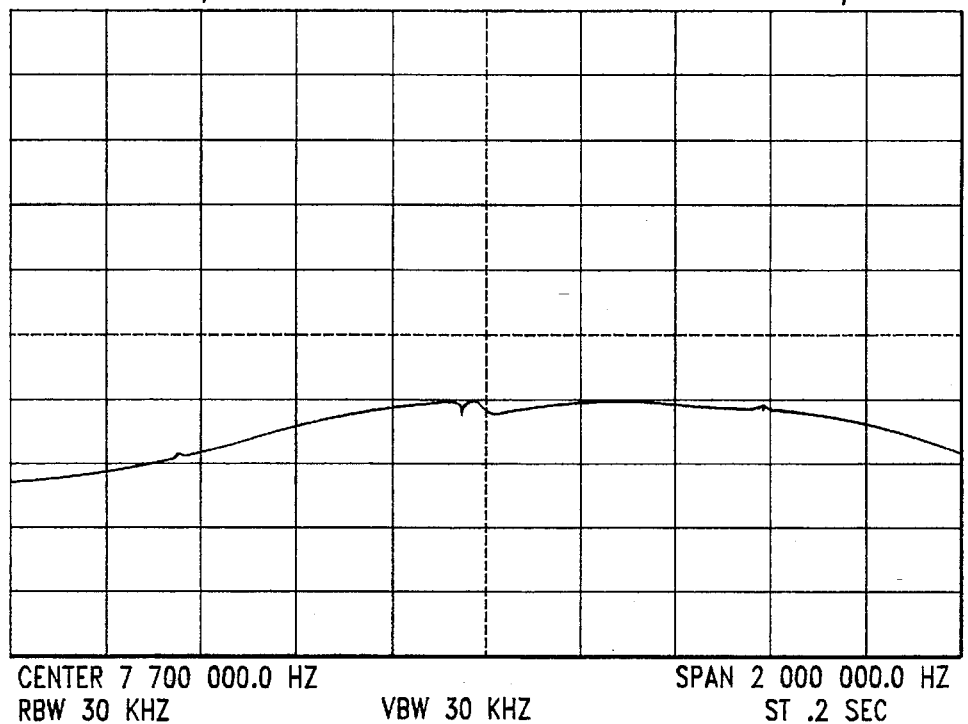

IN-SITU MONITORING OF CONDUCTIVE FILMS ON SEMICONDUCTOR WAFERS

RELATED U.S. PATENT APPLICATIONS

This application is related to commonly assigned, simultaneously filed, U.S. patent application Ser. No. 08/419,206, now U.S. Pat. No. 5,559,428, which is incorporated herein by reference.

FIELD OF THE INVENTION

This invention is directed to the monitoring of change in thickness of a film on a surface, and more particularly to monitoring the change in thickness of a film on a semiconductor substrate.

BACKGROUND OF THE INVENTION

In the semiconductor industry, critical steps in the production of semiconductor wafers are the selective formation and removal of films on an underlying substrate. The films are made from a variety of substances, and can be conductive (for example metal or a magnetic ferrous conductive material) or non-conductive (for example an insulator or a magnetic ferrite insulating material).

Films are used in typical semiconductor processing by: (1) depositing a film, (2) patterning areas of the film using lithography and etching, (3) depositing a film which fills the etched areas, and (4) planarizing the structure by etching or chemical-mechanical polishing (CMP). Films are formed on a substrate by a variety of well-known methods, for example physical vapor deposition (PVD) by sputtering or evaporation, chemical vapor deposition (CVD), plasma enhanced chemical vapor deposition (PECVD), and electro and electroless plating. Films are removed by any of several well-known methods, for example chemical-mechanical polishing (also known as CMP), reactive ion etching (RIE), wet etching, electrochemical etching, vapor etching, and spray etching.

One of the multi-level interconnection processes for metallization to form circuits involves: (1) depositing a seed and/or barrier layer and a conductive film on top of a lithographically defined substrate, so that the conductive film fills in interlevel connections known as vias, or intralevel lines in a dielectric as well as covers the dielectric film, (2) chemical-mechanical polishing (CMP) down to the interface between the barrier layer and the underlying insulating film such as silicon dioxide, leaving the conductive film only in the vias/lines to form wires, (3) depositing another layer of insulating film, (4) planarizing down to a specified thickness, (5) lithography and patterning, and (6) repeating steps (1)–(5). The process is repeated by forming, patterning, and selectively removing films in order to manufacture the desired semiconductor circuit wiring.

It is extremely important with formation and removal of films to stop the process when the correct thickness has been added or removed (the endpoint has been reached). With CMP, a film is selectively removed (i.e. the portion of the film not in the vias or lines) from a semiconductor wafer by rotating the wafer against a polishing pad (or rotating the pad against the wafer, or both) with a controlled amount of pressure in the presence of a chemically reactive slurry. Overpolishing (removing too much) of a conductive film results in increased circuit resistance and potential scrapping of the wafer. Since many process steps have already taken place prior to CMP, scrapping a wafer during the formation of the metal interconnections can mean a significant financial loss. Underpolishing of a conductive film (removing too little) on the other hand leads to a failure in isolating circuits and results in electrical shorts, which leads to rework (redoing the CMP process) which raises the cost of production. Various methods have been employed to detect when the desired endpoint for removal has been reached, and the polishing should be stopped.

The prior art methods for CMP endpoint detection involve the following types of measurement: (1) simple timing, (2) friction or motor current, (3) chemical analysis of the slurry, (4) capacitive, (5) optical, (6) acoustical, and (7) conductive. These prior art methods each have inherent disadvantages such as inability for real-time monitoring, the need to remove the wafer from the polishing apparatus (not in-situ), or a lack of sensitivity.

The simple timing method gives large errors because it is affected by thickness variations of the film and polish rate variations caused by composition of the slurry, pressure of the wafer against the pad, type of pad, and relative rotational speeds. Monitoring the motor current change due to the change in friction produced between the wafer and the pad only provides a resultant value for the variations and provides indirect wafer monitoring at best, with average values for the wafer. Chemical analysis of the slurry requires transporting the slurry from the polishing pad to the analysis location, as well as the use of expensive instrumentation such as inductively coupled plasma (ICP) for atomic emission spectroscopy and does not provide true real time response. Capacitive measurements embed sensing elements in the polishing table below the polishing pad and thus do not provide a continuous and reliable measurement of the change during removal. Capacitive measurements are also especially ill suited for metal films on top of multiple levels of metal interconnections. An optical method has also been used, but requires that the process be interrupted from time to time for measurement of the reflectivity or thickness change. Acoustical methods have also been proposed, however no encouraging data is available so far. Conductive methods monitor current flowing from electrodes embedded in either the polishing pad or the polishing table through the wafer. This type of method requires some kind of direct contact between the electrodes and the wafer surface as well as their exposure to the corrosive slurry and contact with the polishing pad, which can lead to contamination of the pad and possible scratching of the wafer. Results have so far not been positive with this approach.

Non-CMP specific methods have been used to monitor metal articles, but are not suited for in-situ monitoring of the change in thickness of a film on an underlying body. For example, the use of inductive probes to determine breaks in metal articles is known in the art. In IBM Technical Disclosure Bulletin Vol. 9 No 4 September 1966 entitled "Detecting Undesired Breaks in Metal Ladders" by Soychak, a U-shaped core pair is positioned with one core on each side of a ladder, with the top core connected to an oscillator. A continuous metal path around the core pair loads the pair and tank coil of the oscillator and causes its signal level to drop. A break is indicated when there is no loading of the oscillator circuit. This apparatus cannot discriminate film changes from surrounding metal, and when combined with the fact that the cores are on both sides of the object, cannot be used to monitor in-situ the change in thickness of a film, especially in a CMP process.

A technique to measure the thickness of coatings on metal objects is also known. For example, in U.S. Pat. No. 4,715,007 to Fujita et al entitled "Instrument for Measuring Film Thickness", a probe made of an iron core with a coil wound around it is pressed against an iron material whose surface is coated with an insulating film. The change in current as the probe approaches the iron material indicates the thickness of the film. Fujita's apparatus cannot be used to monitor in-situ the change in thickness of a conductive film, and therefore cannot be used to monitor a CMP process for a conductive film. It measures changes in the field extending across the gap between the metal and the probe. This type of sensor cannot be embedded in a surrounding metal container because the leakage fields around the gap would be affected. The field will also be affected by other metals in the area of the stray flux, such as other metal nearby the film to be measured.

Another example is U.S. Pat. No. 3,626,344 to Shaternikov, et al. titled "Eddy Currents Transducer for Electrical Devices to Control Coating Thickness and Surface Profile of Metal Articles." Shaternikov teaches an enhancement in using eddy currents to monitor and control the surface profile of articles featuring both complex configurations and small radii of curvature. Shaternikov's apparatus consists solely of an inductance coil that has been enhanced to strengthen the magnetic field that is generated. His apparatus is simply a transducer to enhance the sensitivity in examining coatings on metal articles. It cannot discriminate between a conductive film in the presence of other metal, and therefore it cannot detect changes in such a film. Therefore it does not have the in-situ monitoring capability to detect changes in films, nor is it suitable for monitoring a CMP process for the same reasons as the above references.

What is not known in the prior art is the in-situ and real time contactless monitoring of the change in thickness of a film on an underlying body which can be any material, including a conductive substrate. Thus, it is an object of the present invention to provide a method and apparatus for in-situ monitoring of the change in thickness of a film on an underlying body.

Another object of the present invention is to provide for in-situ monitoring of the removal of a conductive film from a semiconductor substrate.

Another object of the present invention is to provide for in-situ monitoring of the removal of a film from a semiconductor substrate by chemical-mechanical polishing.

A further object of the present invention is to provide for in-situ monitoring of the formation of a conductive film on a semiconductor substrate.

SUMMARY OF THE INVENTION

In order to accomplish the above and other objects of the present invention, a method and apparatus for in-situ monitoring of the change in thickness of a film on an underlying body includes inducing a current in the film and monitoring the change in the current as the thickness of the film changes. With a conductive film, eddy currents are induced in the film by generating an alternating electromagnetic field with a sensor which includes a capacitor and an inductor.

BRIEF DESCRIPTION OF THE DRAWINGS

These and other features, aspects, and advantages will be more readily apparent and better understood from the following detailed description of the invention, in which:

FIGS. 5A and 5C are sectional views of an alternate implementation of a large area detection sensor assembly and FIGS. 5B and 5D are the resulting excitation spectra;

FIG. 6A is a sectional views of sensors used in series and FIGS. 6B, 6C, and 6D are the resulting excitation spectra corresponding to completely removed, partial, and full metal films;

DESCRIPTION OF THE PREFERRED EMBODIMENTS

The general concept of the preferred embodiment is to position a sensor made of a capacitor and an inductor in close proximity to the film, excite the sensor to create a field that passes through the film, and measure the impact of the film on the sensor circuit. The effect used to monitor the film is described by the equation $$Z = \frac{j\omega L}{(1 - \omega^2 LC) + \frac{j\omega L}{R}}$$

where
Z=circuit impedance,
j=the square root of −1 (imaginary component),
L=inductance,
ω=resonant frequency,
C=capacitance,
R=film loading resistance,
and $$\omega = \frac{1}{\sqrt{LC}}$$

for no resistive loading (R goes to ∞).

Thus in this application, the resonant frequency ω is associated with a chosen C and the L which is dependent on the coupling between the field and the film.

When the film to be monitored is conductive or magnetic, the inductor is used to couple an alternating (ac) electromagnetic field to the film. When the film is present, eddy (Foucault) currents will be induced in the film and two effects will be present. First, the film will act as a lossy resistor, and the effect will be a resistive loading on the sensor circuit, which will lower the amplitude of the resonant signal and lower the resonant frequency. Second, a decrease in the film thickness produces an effect as though a metal rod were being withdrawn from the coil of the inductor, thereby causing a change in inductance as well as a frequency shift. Analogously, an increase in the thickness is like inserting a metal rod into the coil and a corresponding frequency shift in the opposite direction. As the thickness of the film changes, either by addition or removal, the eddy currents will change and thus their resistive loading effect and magnitude of frequency shift will change as well. When the film is not present, there will be no effect on the sensor circuit: no resistive loading, no inductance change, no frequency shift. Thus the change in thickness can be monitored continuously by monitoring the change in the frequency shift.

Note that any conductive film can be monitored in this manner, not just a film on a semiconductor substrate. For example, in the electroplating process metal ions in the plating solution dissolved from a metal block electrode acting as an anode are deposited on a target at the cathode to form a film. This invention can be used to monitor the formation process of the film on the target, both in-situ and real time.

Figure 1:
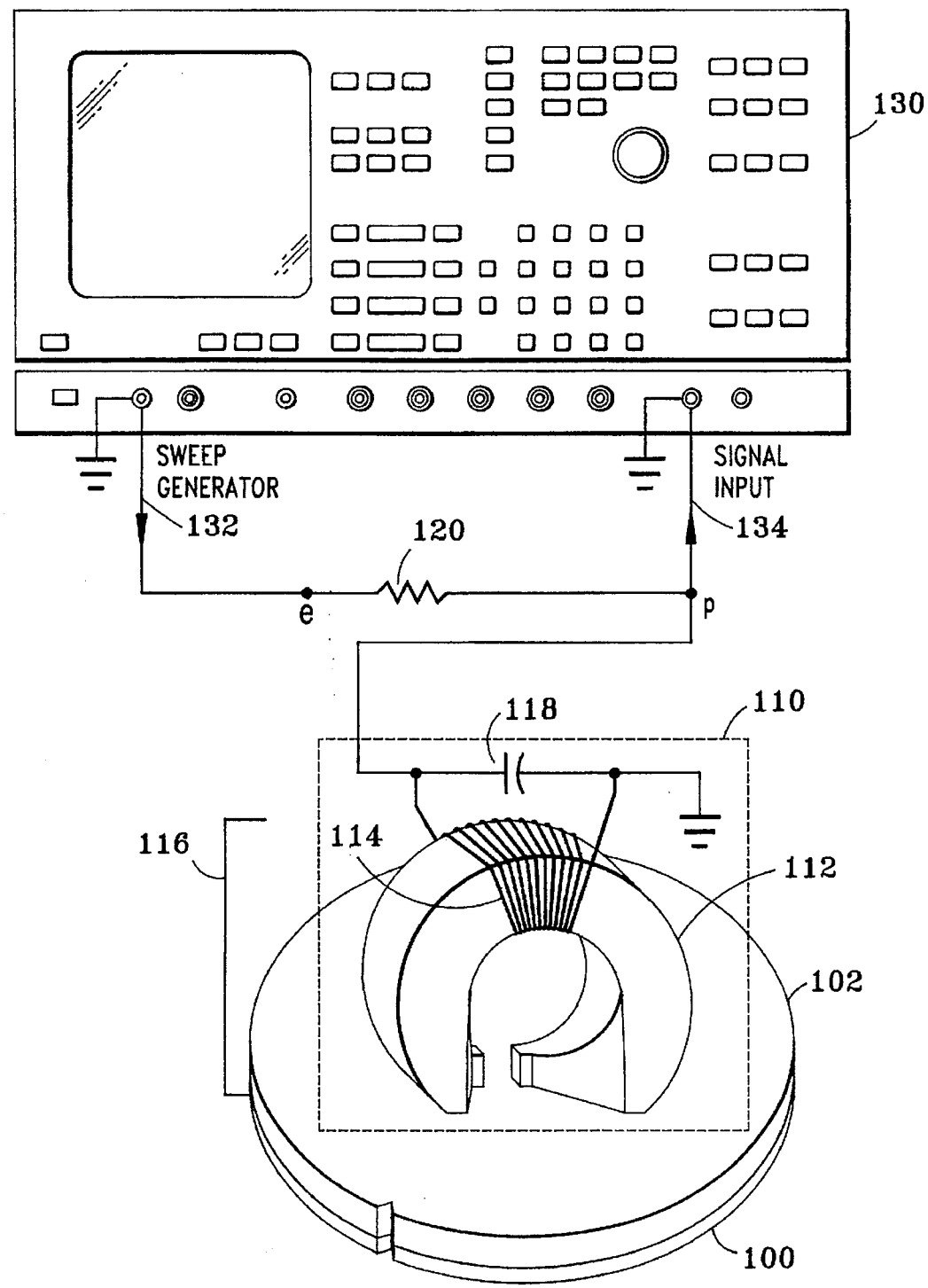
FIG. 1 is a perspective view of the film monitoring apparatus.

FIG. 1 illustrates the basic concept of the invention, in which a parallel resonant electrical circuit is used to monitor a chemical-mechanical polishing process. The LC tank circuit functions as a probe to monitor a conductive film on the wafer surface through proximity of the film's surface to the inductor element. Note that the film can be conductive or magnetic, with non-conductive magnetic materials included such as certain ceramic ferrite materials. Note also that there are other processes with which the invention can be used, such as removal by etching or the formation of a film. These other processes are explained in the alternate embodiments.

In FIG. 1, a metal film 100 has been formed on one side (here, the bottom) of the wafer 102. Note that the wafer can be a doped or undoped silicon substrate or a substrate upon which one or several layers of conducting and/or non-conducting underlying films have already been formed and patterned into gates, wires or interconnects in a multi-level metallization structure. Some examples (not an exhaustive list) of conductive films typically used in a multi-level interconnect structure are Cu, Cr, W, Al, Ta, Ti, as well as noble or near noble metals and TiN and combinations thereof. Note also that the underlying film can be the same material as the film to be removed. This invention has been used to successfully monitor the polishing of a tungsten layer from a 200 mm product wafer with 5 layers of metallization.

In this example, a sensor 110 is positioned on the back side of the wafer. The sensor 110 is made from a parallel combination of a capacitor 118 (for example 4700 pF) and a coil 114 wound on a specially shaped ferrite toroid 112 to form an inductor element 116. This is also called a "tank circuit," and the maximum impedance will occur at the resonant frequency $\omega$. Alternate configurations are possible, for example connecting the inductor and the capacitor of the sensor elements in series, in which case the minimum impedance will occur at the resonant frequency across the L and C elements in the overall circuit. Note that the face of the toroid is parallel to the wafer, and that the sensor 110 can be placed either opposing the metal film 100 (on the back of the wafer) as shown or facing the metal film 100 (on the front of the wafer). It is also possible to locate the inductor coil around the perimeter of the wafer.

Figure 2A:
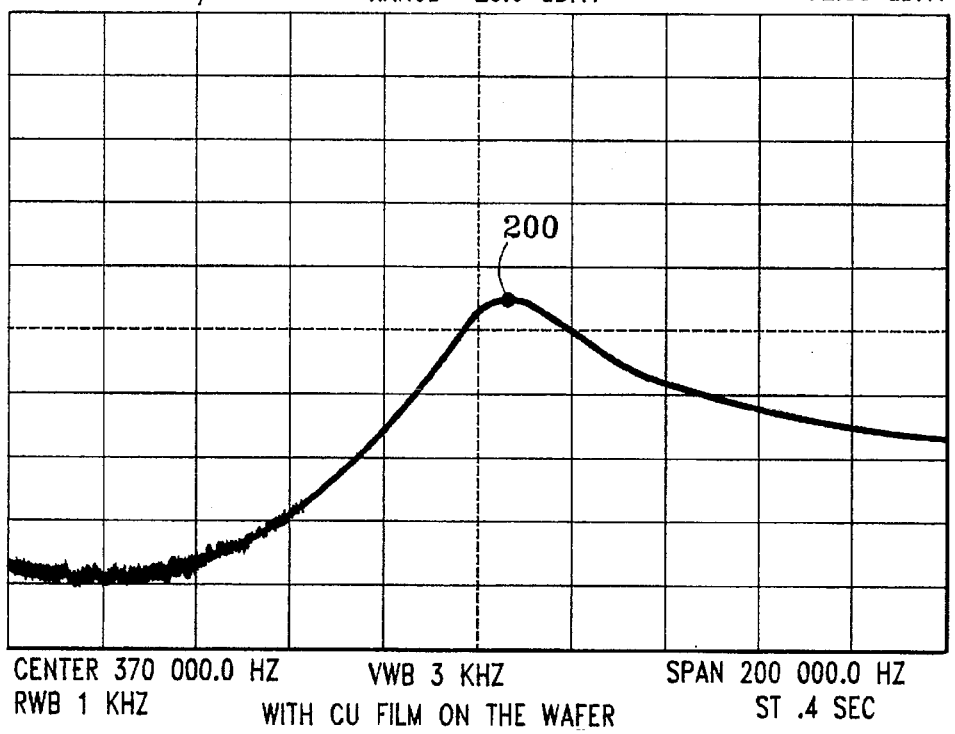
FIGS. 2A and 2B are example graphs of excitation spectra with and without a conductive film present.

The sensor 110 is excited by the sweep output 132 of a spectrum analyzer 130 at excitation point "e" through a resistor 120, for example a series resistor of 2 M$\Omega$, and the spectra is detected at probe point "p". Here, a Hewlett Packard HP3585B spectrum analyzer was used, which can cover the frequency range of detection from 20 Hz to 40.1 MHz. Generally, selection of an appropriate analyzer is determined by the LC value of the sensor circuit. Note that alternate sources of external excitation for the sensor are possible. One example is the swept output from a function generator, which can be a sine, square, or triangle wave generator, another is a swept frequency oscillator. Note also that the sensor can be excited through another impedance device such as an inductor or capacitor or combination, including a resistor, in place of resistor 120. When the sensor 110 is excited, an oscillating current flows through the coil 114, producing an alternating (or oscillating) electromagnetic field. This field, in turn, induces eddy currents in the metal film 100 on the wafer 102. Eddy currents are induced in the metal film which act as a lossy resistor in parallel with the sensor circuit (across the tank circuit) and change the overall inductance L. The entire circuit, including the resistor 120, is set up to function as a voltage divider. The selection of the high impedance series resistor 120 is important for proper operation of the circuit. If the value of this resistor is too high, it will behave like an open circuit and the sensor will barely get excited. If the impedance is too low, it will function like a short and any changes due to the metal being polished away won't be seen as the probe only measures the sweep signal. The signals from probe point p can be viewed as excitation spectra as in FIGS. 2A and 2B on the spectrum analyzer 130. Each of the sensor spectra has a resonant peak at its characteristic frequency $\omega$ associated with the tank circuit and the metal film on the substrate being monitored. The resonant peak 200 has a height corresponding to signal strength, and a width which is a measure of resonant peak frequency spread or distribution. The width is measured at a height 3 dB down from the peak. The quality or Q of the circuit is proportional to the ratio of the resonant peak height over the width. When a metal film is present on the wafer as shown in FIG. 2A, eddy currents are induced in the film and circuit loading as well as inductance changes occur, resulting in a reduction of Q. A low Q is thus characterized by a low peak height 200 and large width. Here, the frequency at which the resonant peak occurs is shown as the "marker" value, or 376,400 Hz. This resonant peak frequency is determined by the capacitor 118, here as an example 4700 pF, and the inductor 116, here as an example 42 mH, plus the effect of the metal film loading.

Figure 2B:
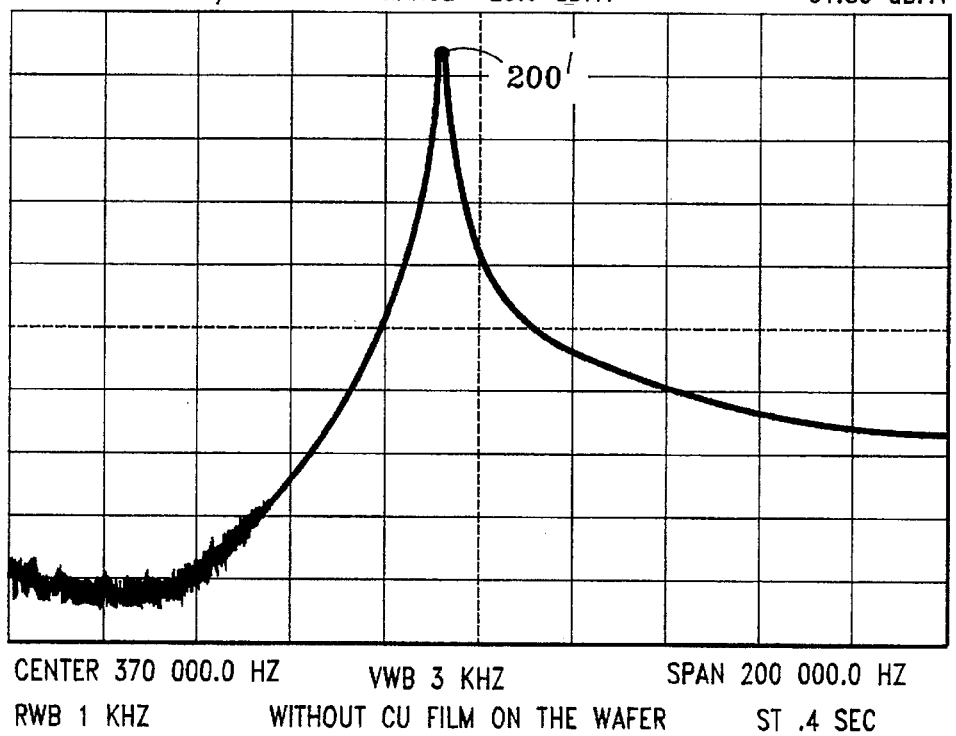

As the film is removed, two phenomena occur as illustrated in FIG. 2B. First, the peak 200 sharpens to peak 200' (i.e. decreases in width), and increases in amplitude (or height). The difference in amplitude is in this case 20.58 dBm, or from −72.38 dBm to −51.80 dBm. Second, the peak shifts to a lower frequency. This increase in height and decrease in width along with the frequency shift are clear indicators that the overall loading of the sensor circuit is being reduced with the removal of the metal film.

Note that the converse is also true. When the metal film is formed on the wafer, the resonant peak will decrease in amplitude, broaden, and shift to a different frequency. This effect plus the fact that the sensor head can be placed away from the wafer, i.e. is not in contact with and can be positioned near the back of the wafer, means that the invention can be used to monitor and control the film formation process, as described in an alternate embodiment below.

During removal of the metal film, the signal output from the sensor circuit will keep changing, such as its peak amplitude, width, and resonant frequency. When all such changes stop, the metal film is completely removed in the proximity of the sensor, and the polishing is complete. Note however, that this invention can be used to stop at a point short of total removal of the film. If the manufacturing process requires that the film be uniformly removed to a fraction of its original thickness, signal characteristics associated with the change in eddy currents can be closely monitored and polishing stopped at the required point, before any portion of the underlying substrate is exposed.

In CMP, the wafer film is placed against the polishing pad on the rotating table and it is difficult to access the film during polishing for direct measurements. In this invention, the sensor head can be placed above the back of the wafer. Thus the sensor can be placed inside the wafer carrier that holds the wafer. The advantages of such a configuration are very significant: no contact with the wafer is required; it can be designed to be insensitive to the presence or absence of the slurry, as well as to the metal in the polishing table and the metal carrier; polishing does not have to be stopped for measurements to occur; and monitoring can take place continuously and in real time. Thus a very practical method and apparatus have been established to provide for a highly sensitive, contactless and contamination-free, in-situ and non-intrusive, real time endpoint determination for a CMP process.

The basic sensor configuration described and illustrated in FIG. 1 was scaled down and reshaped with proper shielding so it could be easily embedded in a metal wafer carrier. Embedding the sensor has several advantages. First, it further avoids exposing the sensor head to the corrosive CMP slurry. Second, it fixes the relative distance between the sensor head and the metal film and permits stable and reproducible detection of the metal film removal process. Third, it eliminates scratching and contamination of the wafer because it prevents direct contact of the sensor head with the wafer. However, embedding the sensor in the wafer carrier presented a problem. The electromagnetic field can leak into the surrounding metal housing of the wafer carrier and penetrate into the underlying metal block of the polishing table. These leakage and penetration fields can induce huge eddy currents which can mask the desired signal from the very thin metal film (on the order of less than 3 microns) on the wafer during the CMP process. One way to solve the field penetration problem is to coat the top of the metal polishing table with a magnetic shield as in FIG. 5C, which is discussed later on.

Figure 3A:
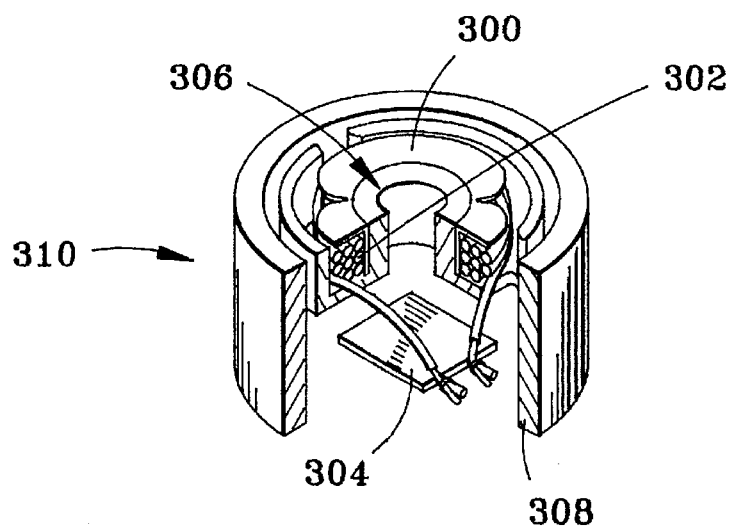
FIGS. 3A and 3B are sectional and exploded views of a sensor head assembly.
Figure 3B:
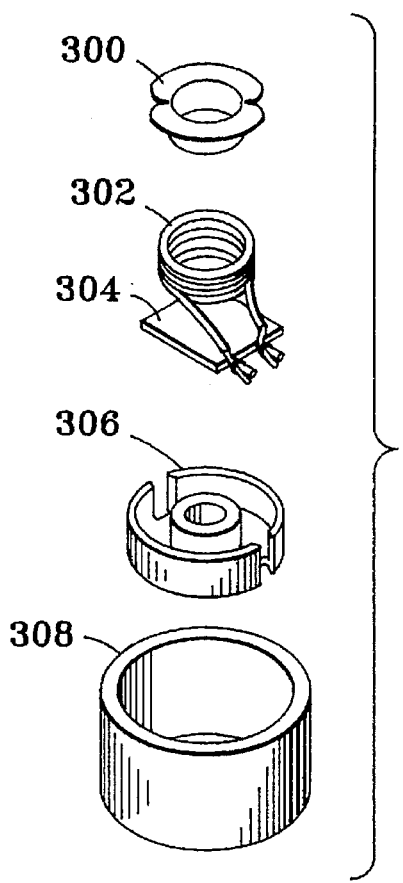
Figure 4:
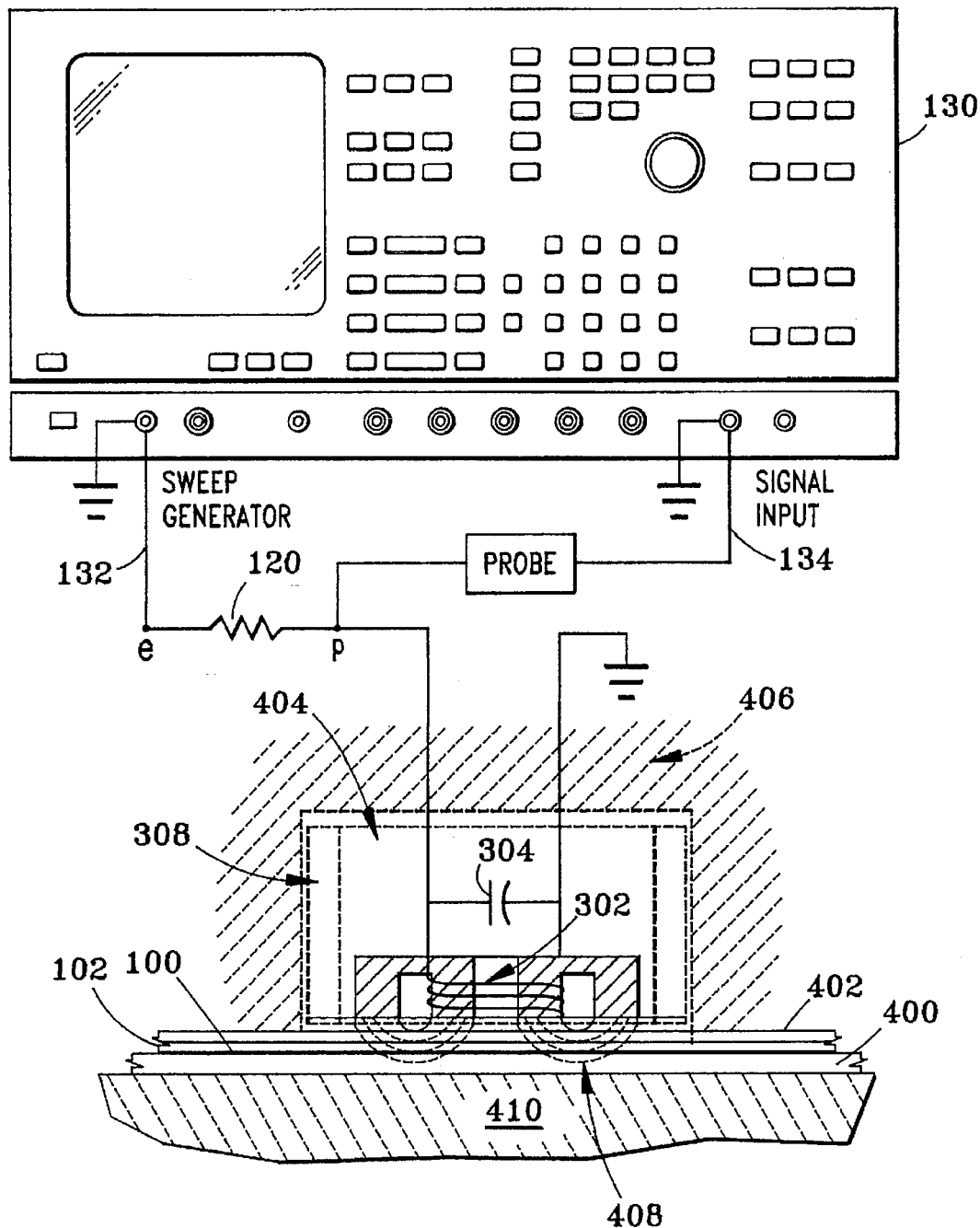
FIG. 4 is a sectional view of the sensor head embedded in a wafer carrier in a CMP tool.

To solve the problem of the field leaking into the surrounding metal housing of the wafer carrier, the sensor was reconfigured to shape and direct the probing electromagnetic field away from the housing and towards the wafer, as illustrated in FIGS. 3A, 3B, and 4. This was accomplished by using a ferrite pot core (half). The pot core surrounds the coil winding in the space between the metal wafer carrier and the coil, and the field is applied across the pot core gap and is therefore directed away from the housing. FIG. 3A shows a cutaway view of the new sensor 310, with FIG. 3B showing the exploded view.

In order to have a high quality factor (Q) circuit, it is necessary to use a coil with a low series resistance, a low loss capacitor in parallel with the coil, and a high source resistance. A coil 302, for example consisting of 5.5 turns of double wire #24 of Belden #8502, with a resistance of 0.7 m$\Omega$, is wound around a modified bobbin 300, for example Ferroxcube #1408 F2D. The coil is electrically connected in parallel to a capacitor 304, for example 470 pF. The resulting inductance calculated from the measured resonant frequency in the absence of any metal loading is thus on the order of 1.25 μH in this example.

The original toroid ferrite sensor head 112 was replaced by a half part of a ferrite pot core 306. The goal was to enhance the detection sensitivity of the eddy currents by directing all the magnetic field lines towards the wafer and prevent them from leaking out into the surrounding metal carrier, (and therefore make the endpoint detection practical). To this end, it is important to choose an appropriate pot core for the sensor head which has a high resistivity, and a low eddy current (hysteresis) loss at the operating frequency. This is because eddy current losses increase with frequency in magnetic materials and will lower the effective frequency of the resonant circuit. Improper selection of ferrite material can lead to a large dissipation loss at a high frequency.

For the preferred embodiment a Ferroxcube #4C4/4C6 type material was used with a sensor resonant frequency around 8 MHz. This selection yields very low dissipation losses and good signal strength. The ferrite core 306 used is of type 1408 which has a gap of about 3 mm. The particular ferrite pot core used was #1408PL004C6 from Philips Components in Saugerties, N.Y., although there are many suitable ferrite pot cores commercially available which have different sizes and characteristic magnetic properties as well as preferred frequency ranges.

The bobbin 300 and coil 302 are nested in the half ferrite pot core 306 with an approximately 3 mm gap. The pot core provides critical shielding and the gap determines the desired penetration depth of the magnetic field used to probe the metal film 100. The bobbin 300, coil 302, core 306, and capacitor 304 are then sealed inside a phenolic tube 308, for example with an inner diameter of 0.55" and height of 0.4", with an epoxy indicated as element 404 in FIG. 4, such as Harman extra fast setting #04001. This arrangement provides mechanical strength since the ferrite core 306 is very brittle.

FIG. 4 shows the sensor embedded in the metal housing 406 of the wafer carrier. The wafer carrier picks up the wafer 102 by applying a vacuum to the wafer, which can be through a cushion pad 402 with holes matching those of the wafer carrier surface. The metal film on the wafer is pressed against the polishing pad 400 on the metal table 410. The magnetic field 408 only slightly penetrates the metal table 410 and therefore is mainly applied to the metal film 100. Thus the principles embodied in FIG. 1 have been successfully applied to the CMP process with the sensor head being embedded in the wafer carrier. The metal film detected is roughly equal to the size of the sensor head, which can be varied but in this case is roughly 1 cm in diameter.

So far a method for localized detection of the metal film in an area of the wafer proximate the sensor has been discussed. This method leaves uncertainties when either the thickness of the film to be removed or the CMP rate across the entire wafer surface is not uniform. Depending on the area of the wafer where the sensor is located, the endpoint detection may correspond to an area anywhere between the earliest and the latest breakthrough of the metal film. If a great degree of non-uniformity exists, a higher degree of uncertainty in predicting the endpoint will result. Fortunately, the same type of sensor for small area detection can be applied to large area detection using the same principles.

In a Strasbaugh polishing tool, the wafer is held by surface tension of a layer of water between a cushion pad and the wafer. With the Strasbaugh, detection of a large area of the metal film 100 on the wafer 102 can readily be achieved by using a large area but small height ferrite pot core 506 as shown in FIG. 5A. The magnetic excitation field 508 for inducing and detecting the eddy currents should cover the whole wafer surface area and should be shielded from the metal carrier by the ferrite core 506. However, the field 508 will penetrate into a large area of the metal body 410 of the polishing table, and this will cause severe masking which is manifested in FIG. 5B.

FIG. 5B shows the excitation spectra resulting from the arrangement depicted in FIG. 5A when viewed on the spectrum analyzer 130. In FIG. 5B a' indicates the spectrum with a metal film on the wafer, and b' indicates the spectrum without a metal film. The effect of the metal table 410 greatly masks the observable effect of the metal film 100 being removed, and makes endpoint detection very difficult.

Figure 5C:
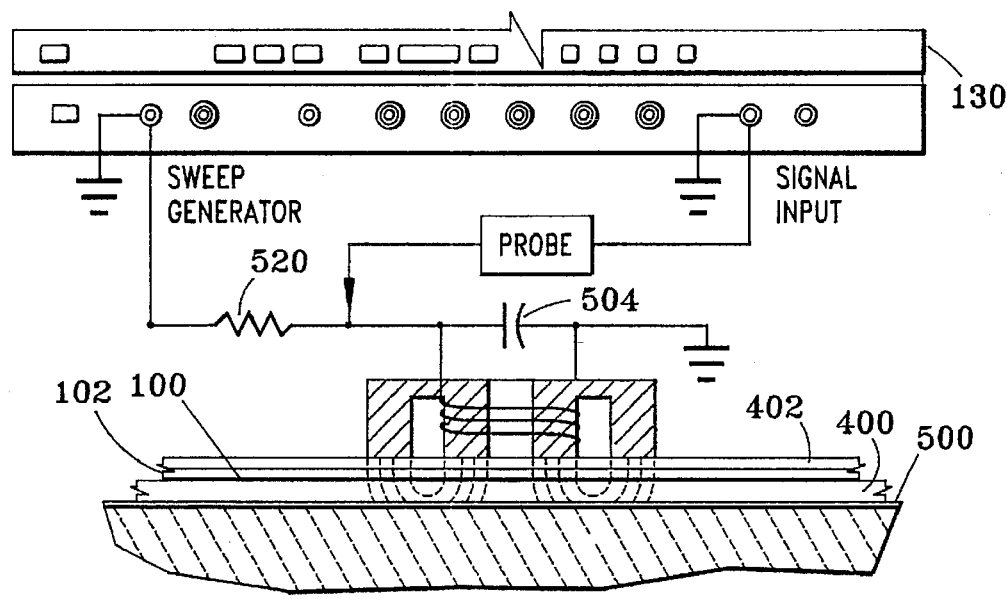

To avoid the effect of the metal table 410 on the magnetic field 508, a layer of ferrite material 500 has been coated on top of the metal polishing table 410 in FIG. 5C. The ferrite coating is used to prevent the penetration of the alternating electromagnetic field into the table and enhance the total field to induce strong eddy currents in the metal film 100 on the wafer 102. The ferrite coating will also improve the signal to noise ratio from the sensor, and increase the contrast for the change from sensing the presence versus absence of a metal film on the substrate.

Figure 5D:
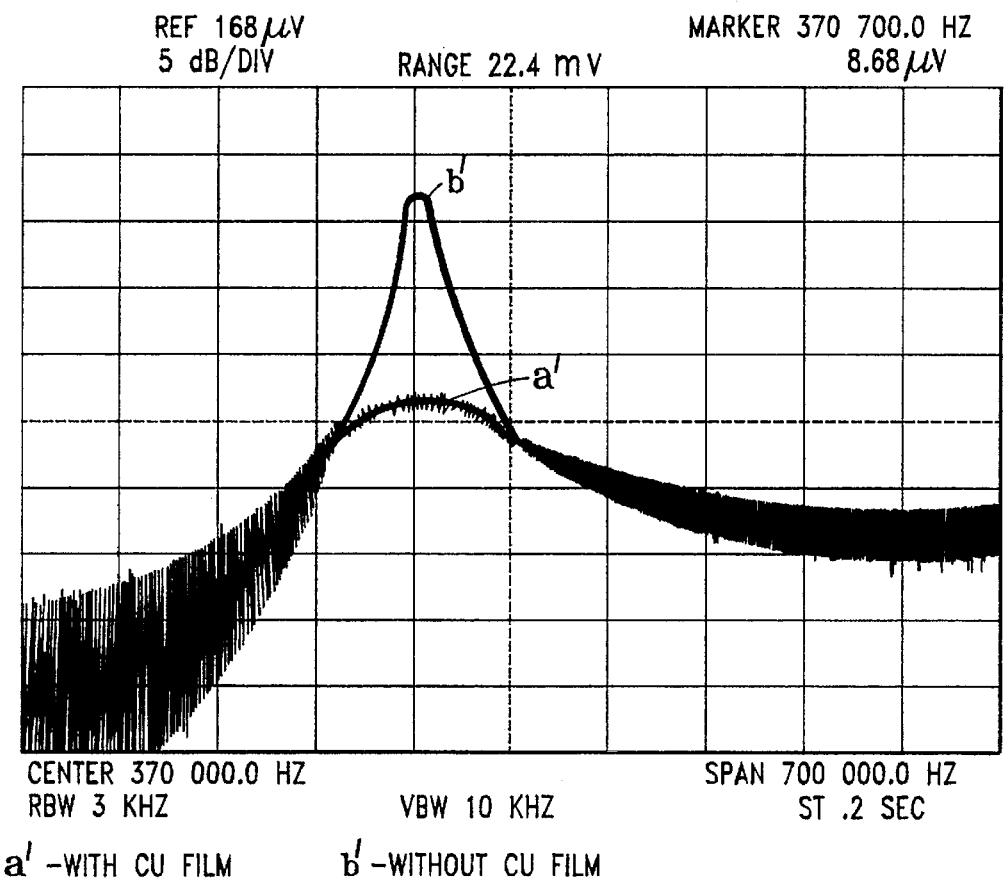

FIG. 5D shows the excitation spectra resulting from the arrangement depicted in FIG. 5C with the ferrite coating on the metal polishing table when viewed on the spectrum analyzer 130. Here again, a' indicates the spectrum with a metal film on the wafer, and b' indicates the spectrum after the removal of the metal film. The effect of the metal table is eliminated resulting in a more discernable signal to detect the endpoint of polishing.

A different solution to large area detection is necessary with the Westech tool, which holds the wafer in the carrier by vacuum with many distributed holes in the cushion pad. It is difficult to put a large area ferrite core sensor inside the Westech carrier without affecting the distribution of vacuum holes that hold the wafer in place. However, many small sensors can be embedded inside the carrier and connected in series, in parallel, or independently (or a combination) with modifications to the signal detection circuit and signal coupling scheme. In addition, if each sensor head has a unique resonant frequency, then a configuration of multiple heads will enable the differentiation among changes in the metal film at various locations across the wafer. This is accomplished by correlating the signals for each of many sensors' characteristic resonant frequencies to their embedded positions inside the wafer carrier. In particular, the real time feedback of metal film thickness status across the wafer can be used for adaptive control of the CMP process.

Figure 6A:
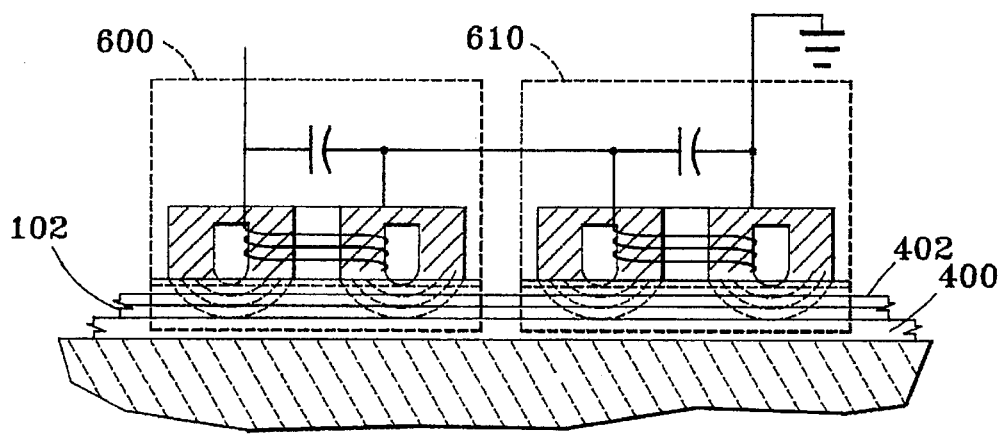
Figure 6B:
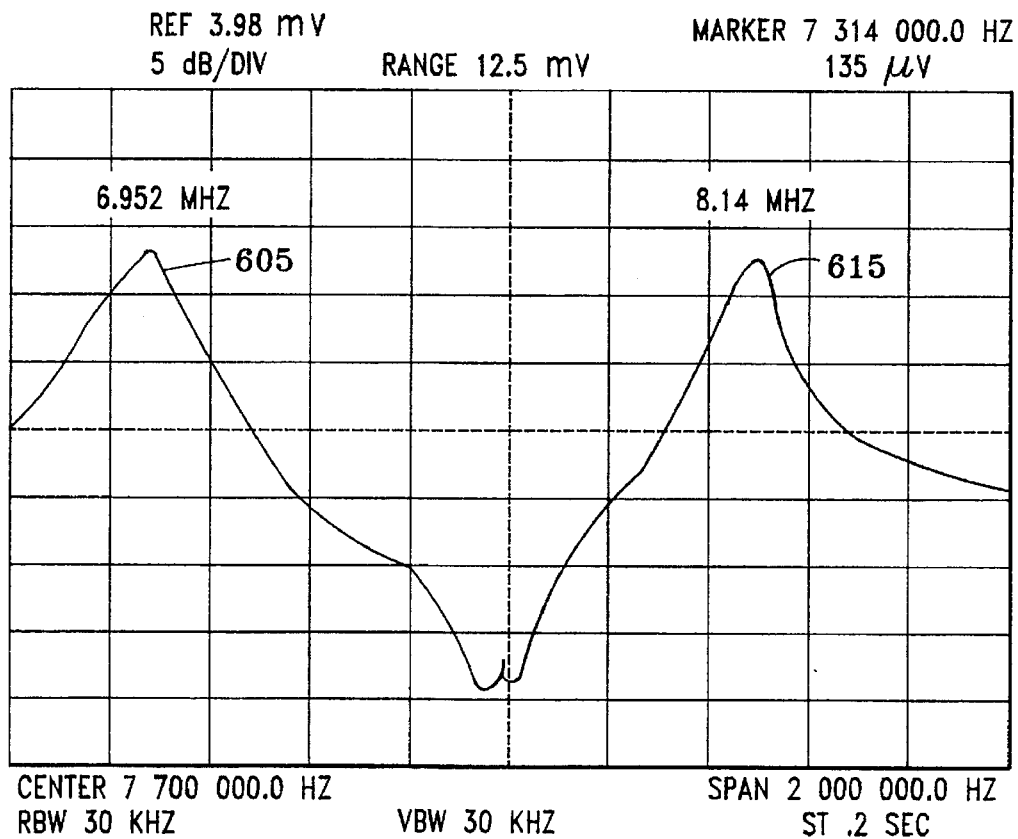

FIG. 6A illustrates the concept of connecting two sensors in series. Note that more sensors can be used for finer granularity of feedback. FIGS. 6B, 6C, and 6D are the resultant spectra using the FIG. 6A configuration corresponding to the wafer with no metal film (FIG. 5B), part of the film removed (FIG. 6C), and full metal film present (FIG. 6D). Each sensor consists of a wound wire coil, a ferrite pot core, and capacitor connected together as discussed previously, and each sensor measures the film characteristics at a different physical location on the wafer. Note that for sensors with small gaps such as illustrated in FIG. 6A, a ferrite coating on the polishing table is unnecessary because the field produced does not extend down into the metal table significantly.

Sensors 600 and 610 have different resonant frequencies. For example, sensor 600 uses a 1222 pF capacitor and has a resonant frequency of 6.952 MHz, and sensor 610 uses a 470 pF capacitor and has a resonant frequency of 8.14 MHz. The resonant frequencies could be altered for example by using different inductances (different coil windings) or different capacitors.

In FIG. 6A, there is no metal film on the wafer 100 under either sensor and the parallel resonant circuits are unloaded and provide a high signal response as the swept frequency is scanned across the frequency spectrum as shown in FIG. 6B. Therefore a peak 605 occurs at 6.952 MHz corresponding to sensor 600, and another peak 615 occurs at 8.14 MHz, corresponding to sensor 605. FIG. 6C shows a resulting spectrum when a metal film on the wafer is present only under sensor 600, and thus only one peak 615 can be seen. FIG. 6D shows how a metal film present under both sensors results in no peaks. In this manner, information about the presence or absence of the metal film at various positions across the wafer is available in real time during the CMP process. Furthermore, the process can be automated with computer control using a dedicated software program to establish closed loop control of the CMP process. For example, if one area of the wafer is being polished at an uneven rate, the process can quickly be adjusted to fix the problem.

With the Westech tool, uneven polishing can result from too little pressure in the center of the wafer, in which case the outer perimeter will be polished more quickly. In contrast, if the pressure in the center of the wafer is too high, then the center of the wafer will be polished more quickly. The pressure on the center of the wafer can be easily adjusted on this type of tool, so if the multiple sensor configuration indicates that the polishing is uneven the pressure can be adjusted and the polishing continued until the desired amount of film has been removed. Adaptive control capability thus results in real time adjustment and compensation for uneven polishing which will increase the yield, eliminate rework resulting from underpolishing, and increase the polishing uniformity, optimizing the CMP process performance.

It is clear that the use of a sensor as described results in a highly effective method and means to monitor the change in thickness of a film on an object. In a particular application of the basic principles described, contactless, real-time, in-situ monitoring of a chemical-mechanical polishing process for semiconductor substrates has been demonstrated.

Alternate Embodiments

Figure 7:
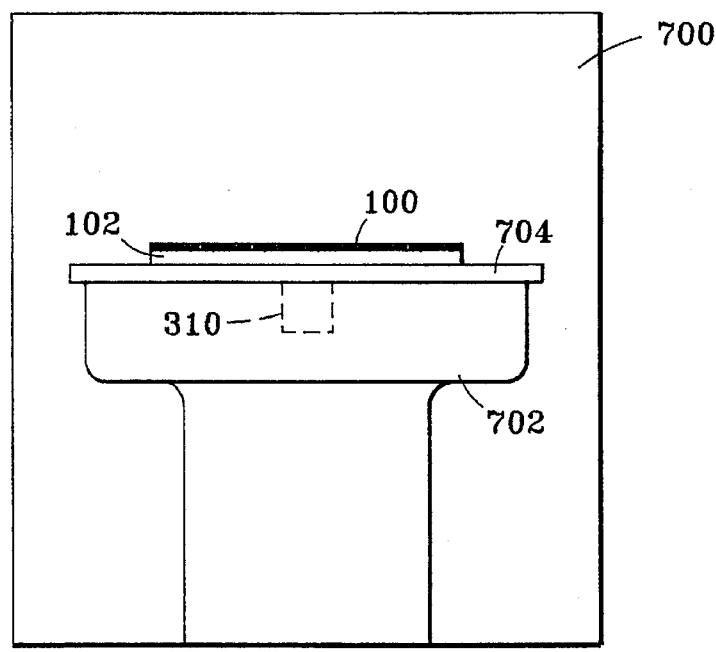
FIG. 7 shows the sensor head used with an etching apparatus.

In a second embodiment, the same type of sensor is used to monitor the removal of a conductive film by etching. There are many different types of etching, for example reactive ion etching (RIE), plasma etching, wet etching, electrochemical etching, vapor etching, and spray etching. FIG. 7 shows a much simplified diagram of a wafer in a RIE chamber 700. The conductive film 100 on wafer 102 sits on a susceptor plate 704, which in turn is placed on an electrode 702. Chemical etchants are introduced into the chamber to etch the film 100. These etchants must be kept away from the sensor 310, just as the chemical slurry is kept away from the sensor with a CMP process. Because the eddy current method allows for positioning of the sensor near to but not in contact with the back of the wafer, the sensor 310 can be placed inside a cavity formed in the electrode. Note that the figure is not drawn to scale; the sensor is approximately 1 cm in size. Note also that virtually any method of film removal can be monitored in situ and in real time in this manner, because of the unique remote positioning of the sensor.

Figure 8:
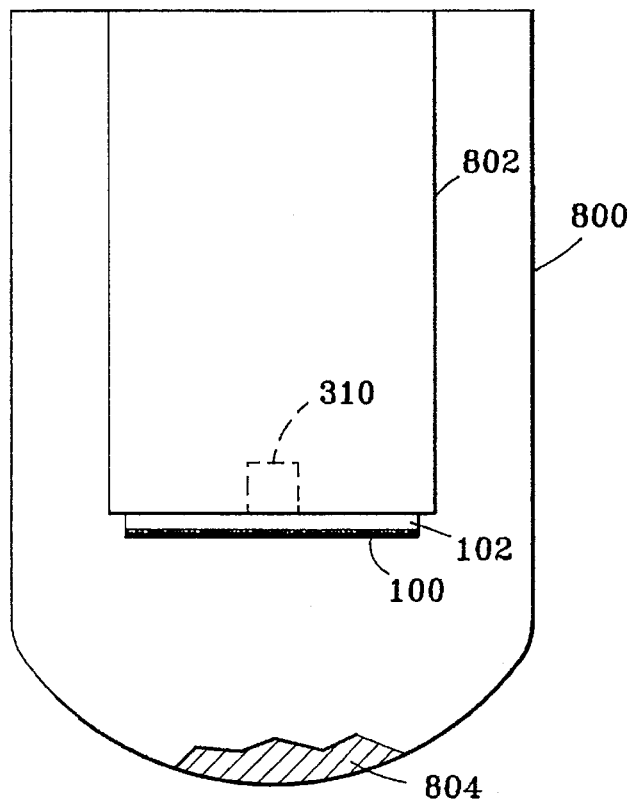
FIG. 8 shows sensor head used to monitor the formation of a film during chemical vapor deposition, all in accordance with the present invention.

In a third embodiment, the same type of sensor is used to monitor the formation of a conductive film. Films can be formed for example by evaporation, sputtering, physical vapor deposition (PVD), chemical vapor deposition (CVD), and plasma enhanced chemical vapor deposition (PECVD) as well as other methods. FIG. 8 illustrates a much simplified version of a chemical vapor deposition reactor chamber for formation of a metal film such as gold or silver. Inside vacuum chamber 800, a heated holder 802 accepts wafer 102. The precursor compound 804 in the chamber reacts to form a metal film 100 on the wafer. Here, as in the other embodiments, the sensor 310 cannot be exposed to the atmosphere inside the chamber. Thus the sensor 310 is placed inside the holder near the back of the wafer, and the eddy currents in the film 100 can be monitored in-situ to determine the thickness of the film during deposition. Here again, note that virtually any method of film formation can be monitored in situ in this manner, because of the unique positional deployment capability of the sensor. Even an RF plasma process can be monitored because the frequency of the sensor can be chosen so that it will not interfere with the RF. Note also that proper shielding and temperature regulation of the sensor may be required, depending on the actual operation of the apparatus. However, these modifications are easily made.

While the invention has been described in terms of specific embodiments, it is evident in view of the foregoing description that numerous alternatives, modifications and variations will be apparent to those skilled in the art. Thus, the invention is intended to encompass all such alternatives, modifications and variations which fall within the scope and spirit of the invention and the appended claims.

What is claimed is:

1. An apparatus for in-situ monitoring of chemical-mechanical polishing a conductive film on a front side of a semiconductor wafer using a tool including a metal wafer carrier which holds the wafer by a back side opposite the front side, comprising:
   a sensor positioned in the carrier proximate the back side of the wafer, the sensor including
   (a) an inductor for inducing a current in the film by producing an alternating electromagnetic field proximate the film, and
   (b) means for shaping the alternating electromagnetic field so that the field is unaffected by the carrier;
   a capacitor electrically coupled to the inductor; and detecting means for detecting a change in the current due to a change in the thickness of the film, the detecting means electrically coupled to the sensor and the capacitor.

2. The apparatus of claim 1 wherein the current is an eddy current.

3. The apparatus of claim 1 wherein the capacitor and the inductor are connected in parallel.

4. The apparatus of claim 1 wherein the sensor includes the capacitor.

5. The apparatus of claim 1 wherein the means for shaping the alternating electromagnetic field comprises a ferrite pot core.

6. The apparatus of claim 5 wherein the sensor is embedded in a means for strengthening the sensor.

7. The apparatus of claim 6 wherein the strengthening means comprises a phenolic tube and epoxy for sealing the sensor inside the tube.

8. The apparatus of claim 1 wherein the alternating electromagnetic field is produced by electrically exciting the sensor from an external source through an impedance means.

9. The apparatus of claim 8 wherein the impedance means is a resistor.

10. The apparatus of claim 8 wherein the impedance means is a combination of an inductor and a capacitor.

11. The apparatus of claim 8 wherein the external source is a sweep output from a spectrum analyzer.

12. The apparatus of claim 8 wherein the external source is a swept output from a function generator.

13. The apparatus of claim 1 wherein the thickness of the film is decreased by removing a portion of the film.

14. The apparatus of claim 13 wherein after the portion of the film has been removed, a remaining portion of the film entirely covers the semiconductor wafer.

15. The apparatus of claim 14 wherein after the portion of the film has been removed, the semiconductor wafer is at least partially exposed.

16. The apparatus of claim 1 wherein the semiconductor wafer further comprises at least one underlying film under the conductive film.

17. The apparatus of claim 16 wherein the underlying film is conductive.

18. The apparatus of claim 16 wherein the underlying film is a metal selected from the group of metals consisting of Cu, Cr, W, Al, Ta, Ti, TiN, and combinations thereof.

19. The apparatus of claim 16 wherein the underlying film is magnetic.

20. The apparatus of claim 16 wherein the underlying film is patterned into a semiconductor device structure.

21. The apparatus of claim 16 wherein the film is the same material as the underlying film.

22. The apparatus of claim 1 further comprising a metal polishing table for holding a polishing pad against which the wafer is held for polishing.

23. The apparatus of claim 22 wherein the metal polishing table has a shielding means on top of the table for limiting the penetration of the alternating electromagnetic field into the table.

24. The apparatus of claim 23 wherein the shielding means comprises a ferrite coating.

25. The apparatus of claim 1 wherein the detecting means detects the change in the current by monitoring a signal change in the sensor resulting from an impedance-change due to the change in thickness of the conductive film.

26. The apparatus of claim 1 wherein the detecting means detects the change in the current by monitoring a frequency shift associated with a resonant peak of the sensor due to the change in thickness of the conductive film.

27. The apparatus of claim 1 wherein a plurality of the sensors are located at different locations proximate the semiconductor wafer for monitoring the removal of the conductive film on the semiconductor wafer.

28. The apparatus of claim 27 wherein the plurality of sensors are electrically connected in series.

29. The apparatus of claim 27 wherein the plurality of sensors are electrically connected in parallel.

30. The apparatus of claim 27 wherein each sensor is set to a unique resonant frequency.

31. The apparatus of claim 30 wherein the resonant frequency of each sensor is determined by a unique inductance.

32. The apparatus of claim 30 wherein the resonant frequency of each sensor is determined by a unique capacitance.

33. The apparatus of claim 1 further comprising means for adjusting the rate of polishing at different locations on the semiconductor wafer, the adjusting means coupled to the tool and to the detecting means.

34. An apparatus for in-situ monitoring of a process for changing the thickness of a conductive film from a front side of a semiconductor wafer using a tool including a metal wafer support means which supports the wafer by a back side opposite the front side, comprising:
   a sensor positioned in the support means proximate the back side of the wafer, the sensor including
   (a) an inductor for inducing a current in the film by producing an alternating electromagnetic field proximate the film, and
   (b) means for shaping the alternating electromagnetic field so that the field is unaffected by the support means;
   a capacitor electrically coupled to the inductor;
   and detecting means for detecting a change in the current due to a change in the thickness of the film, the detecting means electrically coupled to the sensor and the capacitor.

35. The apparatus of claim 34 wherein the thickness of the film is decreased by etching.

36. The apparatus of claim 34 wherein the thickness of the film is increased by electrochemical means.

37. The apparatus of claim 34 wherein the thickness of the film is increased by vapor deposition.

38. The apparatus of claim 34 further comprising means for stopping the change in thickness of the film when a desired thickness has been achieved, the stopping means electrically coupled to the detecting means.

39. The apparatus of claim 34 wherein the current is an eddy current.

40. The apparatus of claim 34 wherein the capacitor and the inductor are connected in parallel.

41. The apparatus of claim 34 wherein the sensor includes the capacitor.

42. The apparatus of claim 34 wherein the means for shaping the alternating electromagnetic field comprises a ferrite pot core.

43. The apparatus of claim 34 wherein the alternating electromagnetic field is produced by electrically exciting the sensor from an external source through an impedance means.

44. The apparatus of claim 43 wherein the impedance means is a resistor.

45. The apparatus of claim 43 wherein the impedance means is a combination of an inductor and a capacitor.

46. The apparatus of claim 43 wherein the external source is a sweep output from a spectrum analyzer.

47. The apparatus of claim 43 wherein the external source is a swept output from a function generator.

48. The apparatus of claim 34 wherein the thickness of the film is decreased by removing a portion of the film.

49. The apparatus of claim 48 wherein after the portion of the film has been removed, a remaining portion of the film entirely covers the semiconductor wafer.

50. The apparatus of claim 48 wherein after the portion of the film has been removed, the semiconductor wafer is at least partially exposed.

51. The apparatus of claim 34 wherein the semiconductor wafer further comprises at least one underlying film under the conductive film.

52. The apparatus of claim 51 wherein the underlying film is conductive.

53. The apparatus of claim 51 wherein the underlying film is a metal selected from the group of metals consisting of Cu, Cr, W, Al, Ta, Ti, TiN, and combinations thereof.

54. The apparatus of claim 51 wherein the underlying film is magnetic.

55. The apparatus of claim 51, wherein the underlying film is patterned into a semiconductor device structure.

56. The apparatus of claim 51 wherein the film is the same material as the underlying film.

57. The apparatus of claim 34 wherein the detecting means detects the change in the current by monitoring a signal change in the sensor resulting from an impedance change due to the change in thickness of the conductive film.

58. The apparatus of claim 34 wherein the detecting means detects the change in the current by monitoring a frequency shift associated with a resonant peak of the sensor due to the change in thickness of the conductive film.

59. The apparatus of claim 34 wherein a plurality of the sensors are located at different locations proximate the wafer foe monitoring the removal of the conductive film on the semiconductor wafer.

60. The apparatus of claim 59 wherein the plurality of sensors are electrically connected in series.

61. The apparatus of claim 59 wherein the plurality of sensors are electrically connected in parallel.

62. The apparatus of claim 59 wherein each sensor is set to a unique resonant frequency.

63. The apparatus of claim 62 wherein the resonant frequency of each sensor is determined by a unique inductance.

64. The apparatus of claim 62 wherein the resonant frequency of each sensor is determined by a unique capacitance.

* * * * *